(12) United States Patent
Sealy et al.

(10) Patent No.: US 6,561,169 B2
(45) Date of Patent: May 13, 2003

(54) CHARGE AIR MANAGEMENT SYSTEM FOR AUTOMOTIVE ENGINE

(75) Inventors: Brent Edward Sealy, Dearborn, MI (US); Jeff Feit, Northville, MI (US); August Thomas Vaught, Harper Woods, MI (US); Wallace Elmer Beaber, Northville, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 09/682,110

(22) Filed: Jul. 23, 2001

(65) Prior Publication Data

US 2003/0015183 A1 Jan. 23, 2003

(51) Int. Cl.⁷ .................................... F02B 33/00
(52) U.S. Cl. ............. 123/563; 123/564; 123/559.1; 123/559.3; 60/611
(58) Field of Search ............. 123/563, 559.1, 123/559.3, 564, 41.29, 41.31; 60/599, 605.1, 611, 618

(56) References Cited

U.S. PATENT DOCUMENTS

| | | | | |
|---|---|---|---|---|
| 4,317,439 A | * | 3/1982 | Emmerling | 123/563 |
| 4,385,594 A | * | 5/1983 | Hauser, Jr. | 123/563 |
| 4,683,725 A | | 8/1987 | Sugiura | |
| 4,760,703 A | * | 8/1988 | Minami et al. | 60/611 |
| 4,875,454 A | * | 10/1989 | Okimoto et al. | 123/559.3 |
| 4,900,343 A | * | 2/1990 | Minami et al. | 60/611 |
| 4,918,923 A | | 4/1990 | Woolenweber et al. | 60/599 |
| 5,031,598 A | * | 7/1991 | Ueda et al. | 123/559.3 |
| 5,036,668 A | | 8/1991 | Hardy | 60/599 |
| 5,125,292 A | * | 6/1992 | Matsuoka et al. | 123/559.3 |
| 5,133,326 A | * | 7/1992 | Nishimura et al. | 123/559.3 |
| 5,345,920 A | * | 9/1994 | Sugino et al. | 123/564 |
| 5,415,147 A | | 5/1995 | Nagle et al. | 123/563 |
| 5,435,289 A | | 7/1995 | Pendlebury et al. | 123/563 |
| 5,492,103 A | | 2/1996 | Goto | 123/564 |
| 5,598,705 A | | 2/1997 | Uzkan | 60/599 |
| 5,669,338 A | | 9/1997 | Pribble et al. | 123/563 |
| 5,809,981 A | | 9/1998 | Berg-Sonne | 123/563 |
| 5,910,099 A | | 6/1999 | Jordan, Jr. et al. | 60/599 |
| 6,006,540 A | | 12/1999 | Coletti | 60/599 |
| 6,006,731 A | | 12/1999 | Uzkan | 123/563 |
| 6,293,264 B1 | * | 9/2001 | Middlebrook | 123/563 |

FOREIGN PATENT DOCUMENTS

| | | | | |
|---|---|---|---|---|
| JP | 358065934 A | * | 4/1983 | 123/559.1 |
| JP | 359018227 A | * | 1/1984 | 123/559.3 |
| JP | 363198723 A | * | 8/1988 | 123/559.1 |
| JP | 363235622 A | * | 9/1988 | 123/559.1 |

* cited by examiner

*Primary Examiner*—Thomas Denion
*Assistant Examiner*—Thai-Ba Trieu

(57) ABSTRACT

A charge air management system for an automotive engine provides air charge densification and cooling during periods of operation at higher load. Two air ducts are provided, with a first for furnishing uncooled and unboosted air, and with a second duct for furnishing chilled and boosted air, with the second duct being chilled during operation with air flowing through the first duct.

17 Claims, 2 Drawing Sheets

CHARGE AIR MANAGEMENT SYSTEM FOR AUTOMOTIVE ENGINE

BACKGROUND OF INVENTION

The present invention relates to a system for providing chilled and super-atmospheric air charge to an engine on a preferential basis.

Engine designers have devised a potpourri of systems for increasing the density and decreasing the temperature of the air charge entering an internal combustion engine.

For ordinary driving, it is desirable, on only a very infrequent basis, to operate the engine at its highest possible output. Thus, it is not desirable or necessary, from the standpoint of cost, fuel consumption, or weight, to have a system, which is capable of providing densified and chilled air to the engine on a continuous basis in a quantity sufficient to support the engine's maximum output.

It is known to provide densifying and even chilling on a basis in which the densification and chilling will operate on a continued basis, but such systems, alluded to above, are hampered by excess cost, weight, and power consumption.

A system according to the present invention overcomes the disadvantages of prior densification and chilling systems while providing excellent throttle response for infrequent accelerations by providing alternative pathways for air to enter the engine's air supply plenum. Thus, during normal operation, the air will enter into the unchilled passageway, allowing the chilling apparatus to be pulled down to a very low temperature so as to provide a transient but very high level of densification and charge cooling. Because the densification apparatus does not operate continuously, power consumption of the apparatus is low. Moreover, because chilling is not required to operate continuously, a very high level of chilling is available on an intermittent basis, which is consistent with usage of such system for normal driving.

SUMMARY OF INVENTION

A charge air management system for an automotive engine includes an air intake plenum for furnishing air to the engine, a first duct for furnishing air to the intake plenum, and a second duct for furnishing air to the intake plenum. A charge booster increases the quantity of air entering the plenum from the second duct. An intercooler removes heat from air flowing through at least the second duct. Finally, a splitter valve controls the relative proportion of air flowing into the plenum from the first and second ducts.

According to the present invention, a charge booster may comprise a supercharger or an exhaust driven turbocharger. If a supercharger is used, it may be driven by a clutched drive.

According to another aspect of the present invention, the splitter valve is preferably operated such that the plenum is furnished with air flowing through the first duct at relatively lower loads and with air flowing through the second duct at relatively higher loads.

Liquid coolant is chilled by the air-to-liquid heat exchanger only if the temperature of the liquid coolant leaving the intercooler exceeds the ambient air temperature by an amount greater than a predetermined threshold.

The refrigerated fluid, which chills the liquid coolant in the liquid-to-liquid heat exchanger, comprises refrigerant fluid flowing in a vehicle air conditioning system. The air conditioning system is called upon to furnish the refrigerant fluid only if the demand placed upon the air conditioning system is less than a predetermined threshold. In other words, if the vehicle occupants demand a high level of air conditioning service, refrigerant fluid will not be allowed to flow to the liquid-to-liquid heat exchanger.

As noted above, the flow of charge air through the first and second ducts is controlled by a splitter valve, which is itself controlled so as to send most of the air into the plenum through the second duct in the event that the throttle associated with the engine is opened at a rate exceeding a threshold opening rate. Similarly, the splitter valve is controlled so as to send most of the air into the plenum through the second duct in the event that the airflow through the engine exceeds a threshold airflow rate.

According to another aspect of the present invention, a method for operating an automotive engine having a charge air management system for furnishing air to an air intake plenum associated with the engine includes the steps of providing air to the plenum through an uncooled duct during normal operation at lower power levels, providing coolant to a cooled duct during normal operation so as to chill the cooled duct when air is being provided to the plenum through the uncooled duct, and providing air to the plenum through the cooled duct during operation of the engine at higher power levels.

DETAILED DESCRIPTION

Figure 1:
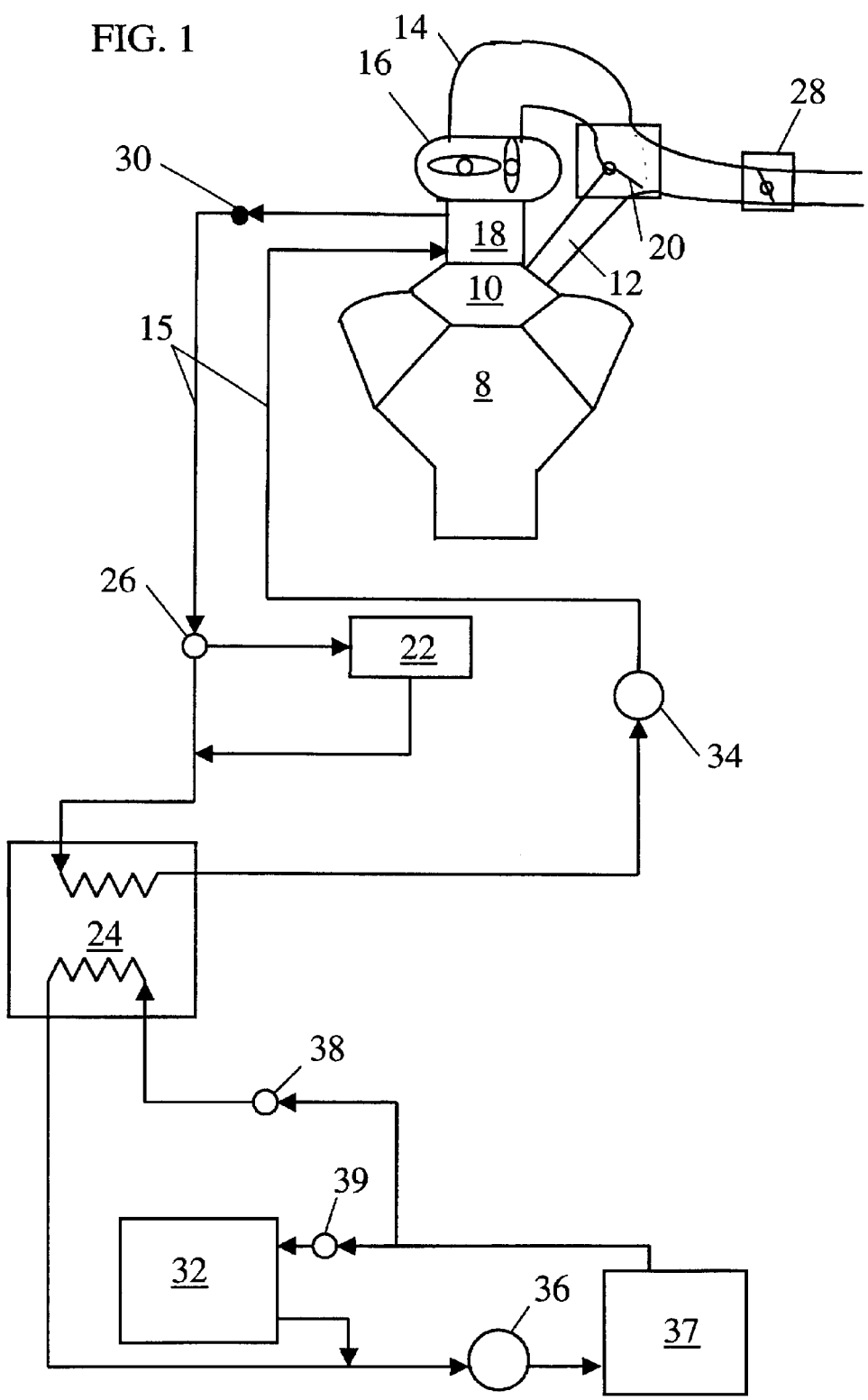
FIG. 1 is a schematic representation of an engine having a charge air management system according to the present invention.

As shown in FIG. 1, engine 8, having air intake plenum 10, is furnished with intake air by means of first duct 12, which is uncooled, and second duct 14, which is cooled by means of intercooler 18. Splitter valve 20 determines whether air flows into plenum 10 by means of first duct 12 or second duct 14.

Air flowing to plenum 10 through duct 14 is subject to densification by means of supercharger 16 and chilling by means of intercooler 18. Those skilled in the art will appreciate in view of this disclosure that supercharger 16 could comprise either a mechanically driven supercharger, or an exhaust driven turbocharger, or other types of screw or vane compressors, or other types of devices known to those skilled in the art and suggested by this disclosure.

In the normal course of events, air enters plenum 10 via first duct 12 without any additional densification or cooling. If, however, the vehicle driver demands high power output from the engine, the splitter valve will close and thereby allow air to enter plenum 10 primarily through second duct 14.

During operation wherein air is being allowed to enter plenum 10 only through first duct 12, intercooler 18 will be pulled down to a lower temperature level by means of liquid coolant which circulates through coolant lines 15 from intercooler 18 through air-to-liquid heat exchanger 22.

If the ambient temperature within which the vehicle is being operated is sufficiently great, heat exchanger bypass control valve 26 will be closed so as to allow liquid coolant to circulate only through liquid-to-liquid heat exchanger 24 and not through air-to-liquid heat exchanger 22.

Figure 2:
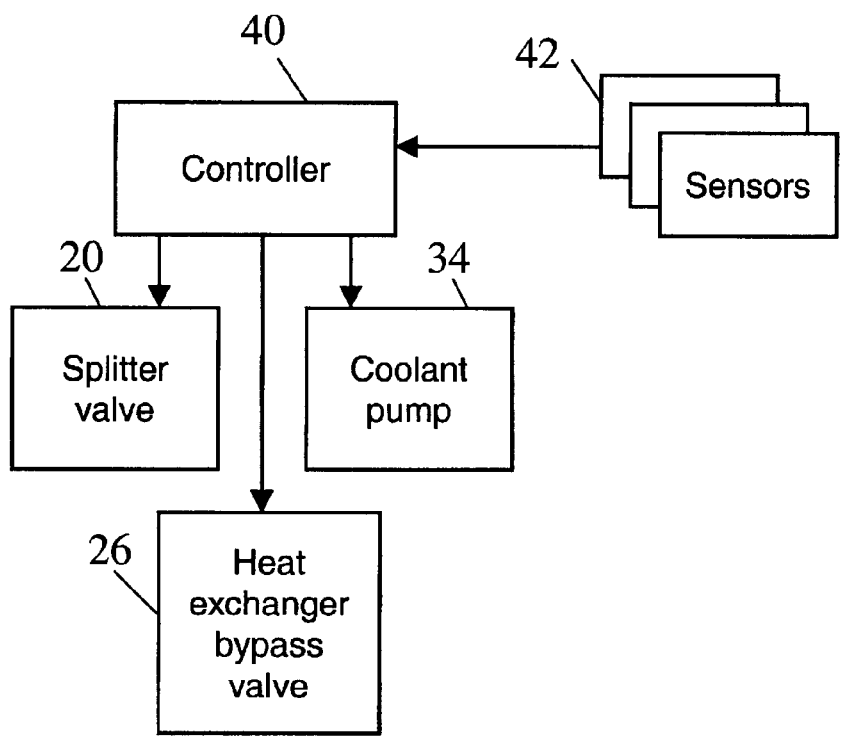
FIG. 2 is a schematic representation of the various control elements of the system according to the present invention.

The rate of circulation of liquid coolant through lines 15 is determined by the operation of coolant pump 34. Coolant pump 34 operates at a speed which is determined by controller 40 (FIG. 2) as a function of one or more engine operating parameters. For example, the speed of coolant pump 34 may be determined by controller 40 as a function of temperature of liquid coolant leaving intercooler 18 as determined by intercooler temperature sensor 30. In this case, if the temperature of the liquid exceeds a predetermined threshold, pump 34 will be operated at a higher speed. Alternatively, pump 34 may be operated by controller 40 at a speed which is determined by controller 40 as a function of the intake vacuum or, in other words, the air pressure within plenum 10. In this case, if air pressure within plenum 10 is at a higher level, indicating that throttle 28 is in an open position, pump 34 may be operated at a higher speed. Alternatively, the speed of pump 34 may be determined in the event that the throttle 28 is opened at very high rate, in which case pump 34 is preferably set at a higher rate of speed. Finally, valves 38 and 39, which control the flow of refrigerant circulated by compressor 36 through condenser 37, through liquid-to-liquid heat exchanger 24, and through air conditioning evaporator 32, will be set to bypass evaporator 32 if the present system is trimmed for maximum performance and if such is sought by the vehicle's driver. Alternatively, valves 38 and 39 may be controlled by controller 40 to bypass liquid-to-liquid heat exchanger 24 in the event that the present system is trimmed for maximum passenger comfort, and in the further event that maximum cooling is called for by the vehicle's passengers.

The operation of splitter valve 12 is handled by controller 40, with the position of valve 12 depending upon the value of one or more engine operating parameters. For example, splitter valve 12 may be opened based upon the rate of throttle opening of throttle 28, or in the event that airflow through the engine is measured by a mass airflow meter, which is one of sensors 42 of FIG. 2, exceeds a threshold airflow rate. In the case of throttle opening control, if throttle 28 opens at a rate exceeding a predetermined threshold, splitter valve 12 will direct air through second duct 14. Similarly, if engine airflow exceeds a predetermined threshold, this indicates that the driver is demanding higher power output, and second duct 14 will be chosen.

In the event that controller 40 determines that engine load, as determined in conventional fashion through the manipulation of data from its various sensors 42, exceeds its threshold, splitter valve 20 may be positioned so as to cause air to flow into plenum 10 primarily through second duct 14.

Finally, according to another aspect of the present invention, a present method for operating an automotive engine having a charge air management system for furnishing air to an air intake plenum associated with the engine operates as alluded to above by providing air to the engine's air intake plenum primarily through an uncooled duct during operation at lower power levels, and providing coolant to a second cooled duct during normal operation so as to chill the cooled duct when air is being provided to the plenum primarily through the uncooled duct. Air is provided to the plenum primarily through the cooled duct during operation of the engine at higher power levels. This cooling is combined as noted above with the use of a charge booster such as a supercharger or turbocharger, or other type of densification apparatus.

While the invention has been shown and described in its preferred embodiments, it will be clear to those skilled in the art to which it pertains that many changes and modifications may be made thereto without departing from the spirit and scope of the invention.

What is claimed is:

1. A charge air management system for an automotive engine, comprising:
   an air intake plenum for furnishing air to the engine;
   a first duct for furnishing air to the intake plenum;
   a second duct for furnishing air to the intake plenum;
   a charge booster for increasing the quantity of air entering the plenum from the second duct;
   a liquid-cooled intercooler for removing heat from air flowing through at least the second duct, with the intercooler being provided with liquid coolant chilled by an air-to-liquid heat exchanger which is exposed to ambient air, and with liquid coolant being allowed to flow through the air-to-liquid heat exchanger only if the temperature of the liquid coolant leaving the intercooler exceeds the ambient temperature by an amount greater than a predetermined threshold; and
   a splitter valve for controlling the relative proportion of air flowing into the plenum from the first and second ducts.

2. A charge air management system according to claim 1, wherein said charge booster comprises a supercharger.

3. A charge air management system according to claim 2, wherein said supercharger is powered by a clutched drive.

4. A charge air management system according to claim 1, wherein said charge booster comprises an exhaust driven turbocharger.

5. A charge air management system according to claim 1, wherein said splitter valve is operated such that said plenum is furnished with air flowing through said first duct at relatively lower loads and with air flowing through said second duct at relatively higher loads.

6. A charge air management system according to claim 1, wherein said liquid coolant is chilled by an air-to-liquid heat exchanger which is exposed to ambient air, with said liquid coolant being further chilled by a liquid-to-liquid heat exchanger which is exposed to refrigerated fluid.

7. A charge air management system according to claim 6, wherein said refrigerated fluid comprises refrigerant fluid flowing in a vehicle air conditioning system.

8. A charge air management system according to claim 7, wherein said liquid-to-liquid heat exchanger is exposed to refrigerant fluid only if the demand placed upon the vehicle air conditioning system is less than a predetermined threshold.

9. A charge air management system according to claim 1, wherein said splitter valve is controlled so as to send most of the air into the plenum through the second duct in the event that a throttle associated with the engine is opened at a rate exceeding a threshold opening rate.

10. A charge air management system according to claim 1, wherein said splitter valve is controlled so as to send most of the air into the plenum through the second duct in the event that the airflow through the engine exceeds a threshold airflow rate.

11. A charge air management system according to claim 1, further comprising a pump for circulating liquid coolant through said intercooler.

12. A charge air management system according to claim 11, wherein said pump operates at a speed which is determined by a controller as a function of one or more operating parameters.

13. A charge air management system according to claim 12, wherein said pump operates at a speed which is determined by a controller as a function of the temperature of liquid coolant leaving said intercooler.

14. A charge air management system according to claim 12, wherein said pump operates at a speed which is determined by a controller as a function of the intake manifold vacuum with which the engine is operating.

15. An automotive engine having a charge air management system, comprising:

an air intake plenum for furnishing air to the engine;

a first duct for furnishing air to the intake plenum;

a second duct for furnishing air to the intake plenum;

a charge booster for increasing the quantity of air entering the plenum from the second duct, with said charge booster comprising a supercharger;

an air-to-liquid intercooler for removing heat from air flowing through the supercharger and into the plenum, with said intercooler being mounted between the supercharger and the plenum;

a splitter valve for controlling the relative proportion of air flowing into the plenum from the first and second ducts;

a coolant system for furnishing liquid coolant to said intercooler, with said coolant system comprising: an air-to-liquid heat exchanger for rejecting heat from the liquid coolant to the ambient; a liquid-to-liquid heat exchanger for rejecting heat from the liquid coolant to a refrigerated liquid chilled by mechanical means;

a pump for circulating the liquid coolant through the intercooler, the air-to-liquid heat exchanger, and the liquid-to-liquid heat exchanger; and a controller for operating said splitter valve and said pump, with said controller operating said coolant system such that at low engine load, heat will be rejected to the liquid-to-liquid heat exchanger while said pump operates at a lower speed, with said coolant system rejecting heat to the ambient through the air-to-liquid heat exchanger at higher engine loads, with said pump operating at a higher speed.

16. A method for operating an automotive engine having a charge air management system for furnishing air to an air intake plenum associated with the engine, comprising the steps of:

providing air to the plenum primarily through an uncooled duct during operation at lower power levels;

providing coolant to a cooled duct during normal operation, so as to chill the cooled duct when air is being provided to the plenum primarily through the uncooled duct; and providing air to the plenum primarily through the cooled duct during operation of the engine at higher power levels.

17. A method according to claim 15, wherein the cooled duct receives air from a charge booster.

* * * * *